United States Patent
Wang

(10) Patent No.: US 11,734,812 B2
(45) Date of Patent: Aug. 22, 2023

(54) FUSED IMAGING DEVICE AND METHOD

(71) Applicant: UnitX, Inc., San Jose, CA (US)

(72) Inventor: Kedao Wang, San Jose, CA (US)

(73) Assignee: UNITX, INC., San Jose, CA (US)

( * ) Notice: Subject to any disclaimer, the term of this patent is extended or adjusted under 35 U.S.C. 154(b) by 260 days.

(21) Appl. No.: 17/205,437

(22) Filed: Mar. 18, 2021

(65) Prior Publication Data
US 2022/0301145 A1   Sep. 22, 2022

(51) Int. Cl.
*G06K 9/00*   (2022.01)
*G06T 7/00*   (2017.01)
*G06T 15/20*  (2011.01)

(52) U.S. Cl.
CPC .......... *G06T 7/0004* (2013.01); *G06T 15/205* (2013.01); *G06T 2207/10152* (2013.01); *G06T 2207/30136* (2013.01)

(58) Field of Classification Search
None
See application file for complete search history.

(56) References Cited

U.S. PATENT DOCUMENTS

| | | | | |
|---|---|---|---|---|
| 7,019,826 B2* | 3/2006 | Vook | ..................... | G06T 7/0002 250/559.34 |
| 7,171,037 B2* | 1/2007 | Mahon | ............. | G01N 21/95684 382/218 |
| 8,144,973 B2* | 3/2012 | Margalit | ............... | G01N 21/956 382/150 |
| 2004/0184032 A1* | 9/2004 | Mahon | ............. | G01N 21/95684 356/237.3 |
| 2004/0184648 A1* | 9/2004 | Zhang | ..................... | G06T 7/586 382/141 |
| 2004/0184653 A1* | 9/2004 | Baer | ................ | G01N 21/95684 382/145 |
| 2014/0205146 A1* | 7/2014 | Holz | ........................ | G06T 7/50 382/103 |
| 2017/0236269 A1* | 8/2017 | Ando | ..................... | G06T 7/586 382/152 |
| 2018/0328855 A1* | 11/2018 | Kido | .................. | G01B 11/2509 |

* cited by examiner

*Primary Examiner* — Avinash Yentrapati

(74) *Attorney, Agent, or Firm* — Travis Banta; Loyal IP Law, PLLC

(57) ABSTRACT

A fused imaging device and method are disclosed. The device comprises a light source component, an image capture component, and a control component. The control component may be configured to control the light source component to illuminate a target object based on a preset plurality of first optimal lighting configurations. The control component may further control the image capture component to capture images of the target object to obtain multiple first images, under the illumination of the light source component and generate a target image of the target object, based on the first images. The control component may further adjust the incidence angle, pattern, and wavelength of the light source in the light source component, as well as the exposure, lens focus, and polarization of the image capture component, to detect target object defects in captured images of the target object.

19 Claims, 11 Drawing Sheets

FUSED IMAGING DEVICE AND METHOD

TECHNICAL FIELD

The present disclosure relates to the field of machine vision, and in particular to a fused imaging device and method.

BACKGROUND

In industrial production, image recognition is used to detect surface defects on products, which include, for example, metal castings. However, when capturing images, a particular light source is frequently not conducive for imaging a product having a particular surface, a particular defect, and/or a particular environment. For example, surface materials or characteristics on products that affect light quality of a captured image include reflective qualities, transparent qualities, or black/opaque qualities. In another example, a particular light source may not be compatible with imaging multiple types of defects including, for example, scratches or dirt. In another example, a particular light source may not be compatible with creating satisfactory images in various environments, such as laboratories and production lines. The light quality of captured images directly affects the ability to detect surface defects on products and may result in reduced accuracy for correctly identifying such defects.

SUMMARY OF THE DISCLOSURE

Disclosed below is a method. The method comprises illuminating, by a plurality of light sources controlled by a processor, a target object according to a plurality of preset first optimal lighting configurations. The plurality of first preset optimal lighting configurations include a lighting configuration matrix representing a working condition of each one of the plurality of light sources. The method further comprises capturing, by an image capture component controlled by a processor, multiple images of the target object to obtain a plurality of first images under the illumination of the light source component. The method further includes generating, by the processor, and based on the capturing of the multiple images of the target object, a target image of the target object based on the plurality of first images.

BRIEF DESCRIPTION OF THE DRAWINGS

The following gives a detailed description of the specific embodiments of the disclosure, accompanied by diagrams to clarify the technical solutions of the embodiments and their benefits.

DETAILED DESCRIPTION

The technical solutions in the embodiments of the present invention will be clearly and completely described below, accompanied by diagrams of embodiments. The described embodiments are only an explanatory and illustrative part of many embodiments consistent with the scope of this disclosure and is intended to describe conceptual implementations for purposes of informing one of ordinary skill in the art with novel developments to the art described herein in lieu of disclosing all possible embodiments. Based on the embodiments of the present invention, all other embodiments obtained by those of ordinary skill in the art without creative work shall fall within the scope of the present disclosure.

Manufacturing currently faces many obstacles regarding the light sources used for capturing images of industrial products. For example, no single existing light source provides adequate light for capturing an image with quality sufficient to ascertain the existence of surface defects on all surface materials. For different surface materials, such as materials with as reflective, transparent, or black surfaces, wavelengths and patterns of light emitted by a light source to capture high-quality images have been conventionally necessary for adequate image quality. Further, no conventional single light source provides adequate lighting for image capture with multiple types of defects or with different types of defects such as scratches, dirt, and defects with random locations, sizes, or shapes. Such imagery has conventionally required customized light sources with specific incidence angles and patterns. Finally, no conventional light source has been adequate to provide adequate lighting for image capture in all environments, because different environments, such as laboratories and production lines) are typically large areas and which produce products that are made from different materials. Thus, capturing images with adequate quality for detecting defects has relied on manual manipulation of distance and geometry between lighting, a camera, and the product to capture high-quality images.

The present disclosure proposes a fused imaging method and device. By using customizable first optimal lighting configurations, adjusting incidence angles, patterns, and wavelength of light emitted by a light source in the light source component, the light source component may adequately illuminate a product for high quality image capture in many conditions, such as multiple surface materials, defect types, and environments. Under the illumination of the light source component, the control component may automatically adjust the exposure, lens focus, and polarization of the image capture component, and control the image capture component to capture multiple images of the target object, and then generate the target image using the multiple collected images, thereby improving the accuracy defect detection using the image.

Figure 1:
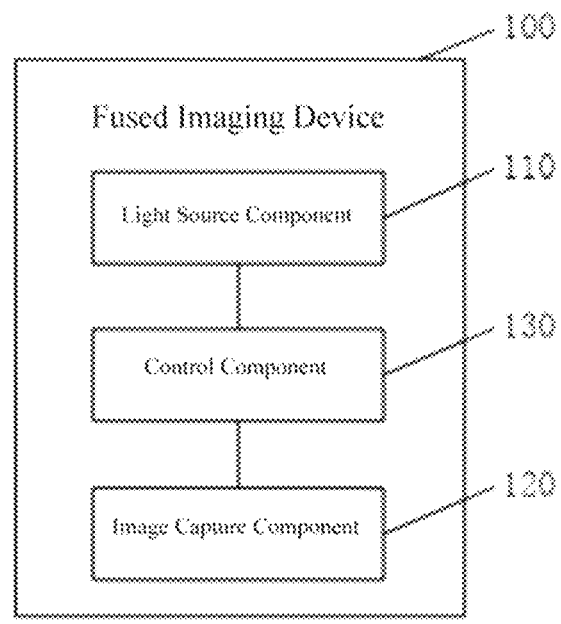
FIG. 1 illustrates a block diagram of a fused imaging device based on an embodiment of the present disclosure.

FIG. 1 illustrates a block diagram of a fused imaging device 100 according to an embodiment of the present disclosure. As shown in FIG. 1, the fused imaging device 100 includes a light source component 110, which illuminates a target object, such as a metal casting or other product. Light source component 110 comprises a light source and a light housing. The light source within light source component 110 comprises a plurality of LEDs and/or flexible screens. Fused imaging device 100 also includes an image capture component 120, which captures images of the target object. Image capture component 120 may be implemented by a camera with an image (e.g., optical or light) sensor which receives light, and creates an image based on light received into the image sensor. Fused imaging device may further include a control component 130, which is connected to the light source component 110 and the image capture component 120.

Control component 130 may be implemented by a hardware processor disposed within fused imaging device 100. Control component 130 may further include hardware components which may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein. Control component 130 may execute software instructions, sequences of instructions, routines, data structures, display interfaces, and other types of structures that execute computing operations. Control component 130 may, for example, control the light source component 110 to illuminate a target object. Control component 130 may illuminate the target object according to a plurality of preset first optimal lighting configuration which includes a lighting configuration matrix, where each value of the lighting configuration matrix represents a working status of each independently controllable LED and/or each pixel on a flexible screen. The working status may be indicated using an indicator representing at least one of an off state, an on state, or a value of brightness.

Control component 130 may further control the image capture component to capture multiple images of a target object to obtain multiple first images, under the illumination of the light source component. Once these multiple first images are obtained, control component 130 may generate a target image of the target object based on the plurality of first images.

In another embodiment, light source component 110 may illuminate a target object. The light source component 110 may comprise a light source and a light housing, and the light source may comprise a number of LEDs (light emitting diodes) and/or flexible screens. The light source may also comprise a set of other LEDs that may be independently controlled. The present disclosure does not limit the specific types of light sources. In another embodiment, when the light source is multiple LEDs, the multiple LEDs may be formed into the light housing as a Printed Circuit Board (PCB) by either surface mounts or direct insertions.

Colors (e.g., wavelengths) of the light emitted by the LEDs may be the same, substantially the same, or different. For example, the LEDs may emit white, red, blue, green lights or even infrared and ultraviolet. Different colors or types of the light emitted by the LED are emitted at different wavelengths of light according to known principles of optical physics. Those skilled in the art may select LEDs with different wavelengths/colors according to specific conditions that are appropriate for a particular circumstance and is not to be considered limited by this disclosure.

In another embodiment, it is possible to control the wavelength of the light source, based on the principle of color mixing (e.g., combining red and green light sources to produce yellow light) by controlling the brightness (i.e., current) of multiple LEDs; it is also possible to control the pattern and incidence angle of the light source, by centralized placement of multiple LEDs and independent control, by control component 130, of all or some of the LEDs including the ability to turn lights on, to turn lights off, or to adjust a brightness of LEDs.

For example, assuming that there are 64 LEDs installed in a light housing implemented in lighting component 110, the 64 LEDs may be compactly packed in an 8 LED by 8 LED square, where each LED is an independently controlled channel. This allows fine control of the 64-LED light source, giving control component 130 the ability to adjust the light source's pattern and/or incidence angle. The pattern and/or incidence angle of the light source may also be adjusted by controlling some of the 64 LEDs (for example, 48 or 32 LEDs). The present disclosure does not limit the number of controllable LEDs.

In another embodiment, when the light source is implemented as flexible screens, the light source may be implemented as a whole screen or may comprise multiple sub-screens. The flexible screens may also be formed inside the light housing of lighting component 110. The flexible screens may be flexible LCD screens, LED screens, OLED screens, micro-LED screens, or other types. The present disclosure does not limit the specific type of flexible screens.

In another embodiment, all or some pixels in the flexible screen may likewise be independently controlled by control component 130 including the ability to turn a light on, to turn a light off, or to adjust a brightness of one or more pixels. Control component 130 may also control a wavelength, pattern, and incidence angle of the light source in a manner similar to that discussed above with respect to using LEDs in the light source. However, compared with LEDs, the resolution of the flexible screen is higher, allowing for finer and more accurate control of the light source.

In another embodiment, the light housing within light source component 110 may be implemented approximately in the shape of a hemispherical shell as will be discussed below. The light source may be set as cross-sections, geodesic dome, or hemispherical shell inside the light housing, such that the vertical and/or the horizontal incidence angle of the light from the light source may be controlled by control component 130.

Figure 2A:
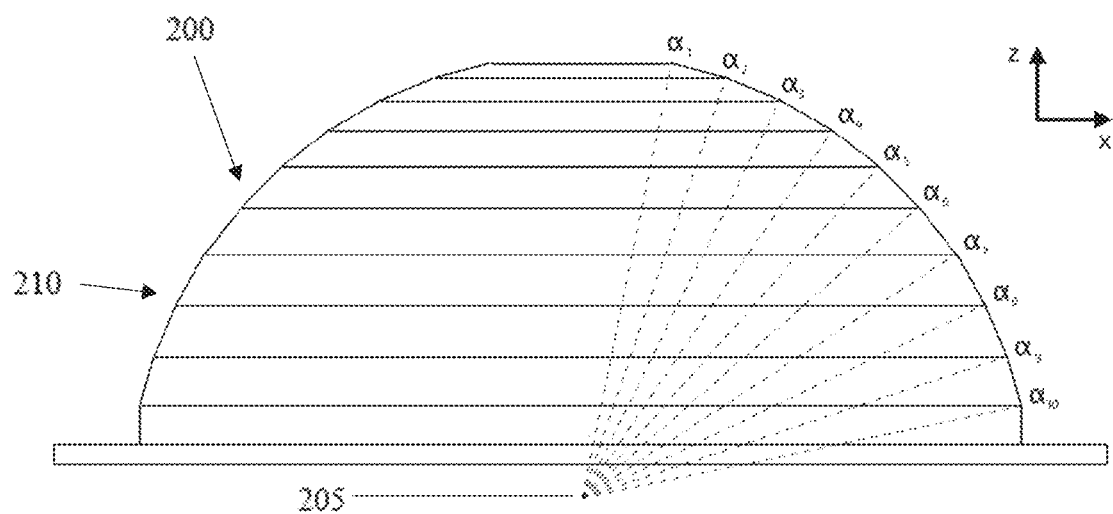
FIGS. 2a and 2b illustrate schematic cross-sectional views of a hemisphere according to an embodiment of the present disclosure.
Figure 2B:
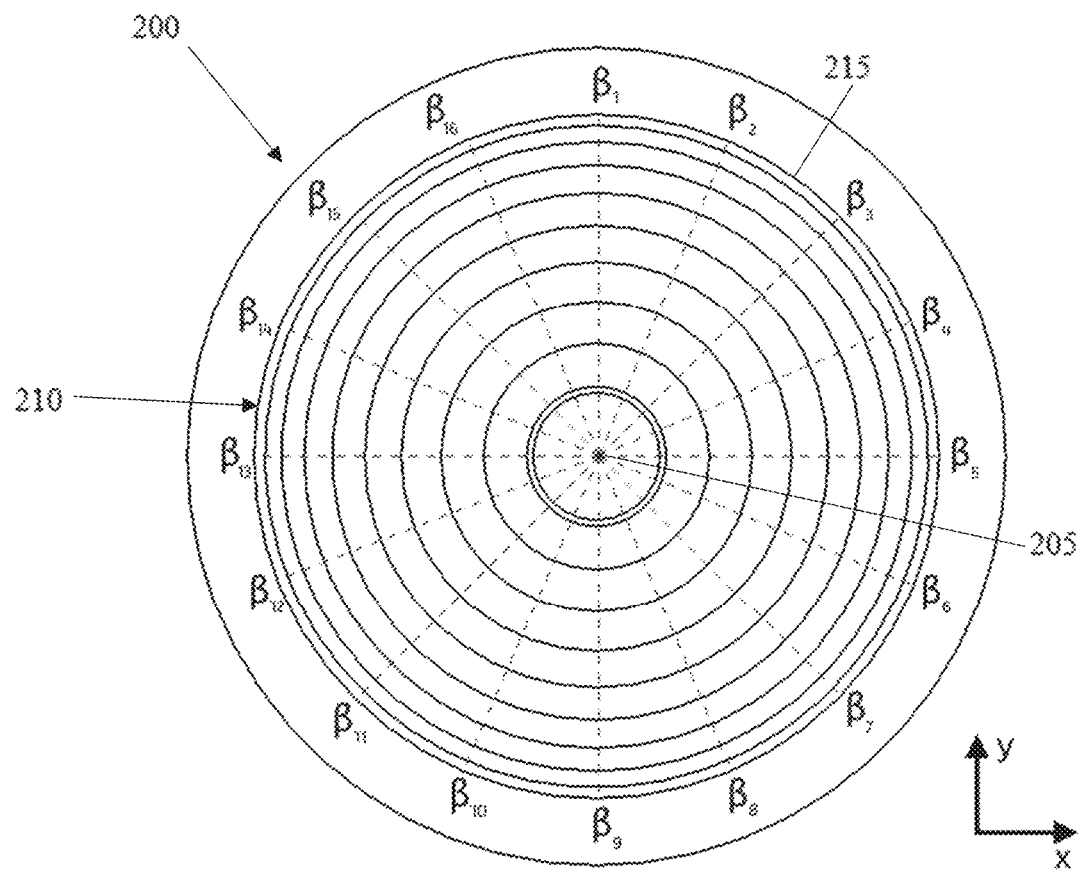

FIGS. 2A and 2B illustrate schematic cross-sectional views of a hemispherical shell 200, discussed above and according to an embodiment of the present disclosure. As shown in FIG. 2A, hemispherical shell 200 is illustrated as a vertical cross-section of a hemisphere. Multiple radii extending to α1, α2 . . . α10 are illustrated as emanating from a center of the hemisphere 205 to an edge of hemisphere 205 where the labels of α1, α2 . . . α10 are shown on the page. Each of radii α1, α2 . . . α10 are disposed such that the angle between neighboring radii (e.g., α1 and α2, α2 and α3, etc.) is set at a first preset value. As used herein, the point at which each of radii α1, α2 . . . α10 meet an edge of the hemispherical shell 200 is referred to as intercept or an intersection. Intercepts that are neighboring (or adjacent) may each be joined by line segments such that these multiple line segments form an approximate arc that follows the edge of hemispherical shell 200. Each intercept may be extended in the horizontal plane to divide the hemisphere into multiple cross-sections 210 where a light source may be installed in the ring on each cross-section.

In another embodiment, different cross-sections 210 may form different vertical incidence angles so that the vertical incidence angle may be controlled by control component 130 controlling each light source in the cross-sections. As the vertical incidence angle changes, the angle between the surface of the target object and the x-y plane (using the illustrated cartesian plane references) varies to give different reflections, achieving different effects in image capturing.

FIG. 2B illustrates a schematic diagram of one of a plurality of horizontal cross-sections 210 of the hemisphere. As shown in FIG. 2B, starting from the center of the hemisphere 205, multiple radii extending to β1, β2 ... β16; may be identified such that the angle between neighboring radii is set at a second preset value, and each radius meets the arc of the hemisphere at an intercept (i.e., intersection), labeled as β1, β2 ... β16. Each neighboring (or adjacent) intercept may be joined by to the center of hemisphere 205 with line segments which may then be extended vertically into a plane to divide the hemisphere into multiple vertical sections 215 (which identifies a vertical section between β2 and β3 but intended to refer collectively to any vertical section which exists between any two neighboring intercepts β1, β2 ... β16).

In another embodiment, different vertical sections 215 may be formed at different horizontal incidence angles such that a vertical incidence angle may be controlled by controlling the light source on the vertical sections 215. Along a z-axis (as referenced in a cartesian sense using the illustrated cartesian plane representation), a surface of a target object may produce different reflections as the horizontal incidence angle of the vertical sections 215 change so as to achieve different image capturing effects.

In another embodiment, U (horizontal) cross-sections may be intersected with V vertical sections (U and V are both positive integers) to form U×V light-emitting areas, and each light area may be individually controlled by control component 130. Thus, both vertical and horizontal incidence angles may be independently controlled, allowing for better image capture.

In another embodiment, the light source may be implemented as a plurality of cross-sections, a geodesic dome, or hemispherical shell inside the light housing, according to the above-mentioned vertical and/or horizontal incidence angle. For example, the light housing may be divided into cross-sections, with each section having a light source such as one or more LEDs or other lights attached to flexible materials. Alternatively, the light housing may be an approximately geodesic dome comprised of a plurality of individual small triangles, with each small triangle having a piece of flexible screen or other rigid material with a rigid light-emitting source attached. When the light source is the entire flexible screen, the flexible screen may be bent into a hemisphere and formed into the light housing within light source component 110.

Figure 3A:
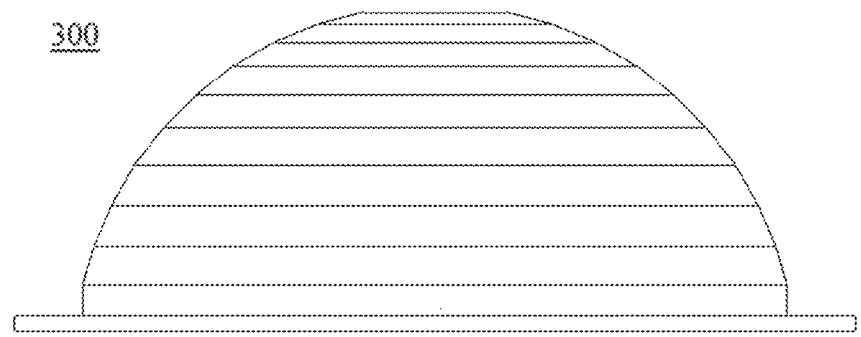
FIGS. 3a to 3g illustrate schematic diagrams of the light source arranged as cross-sections inside a light housing according to an embodiment of the present disclosure.
Figure 3B:
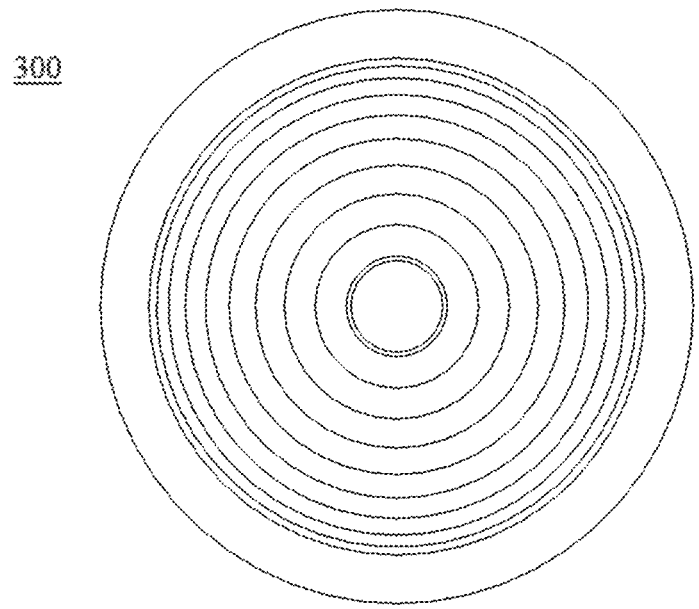
Figure 3C:
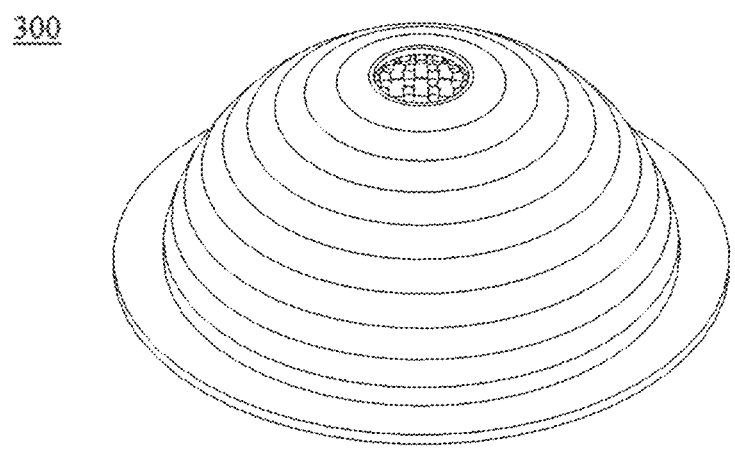
Figure 3D:
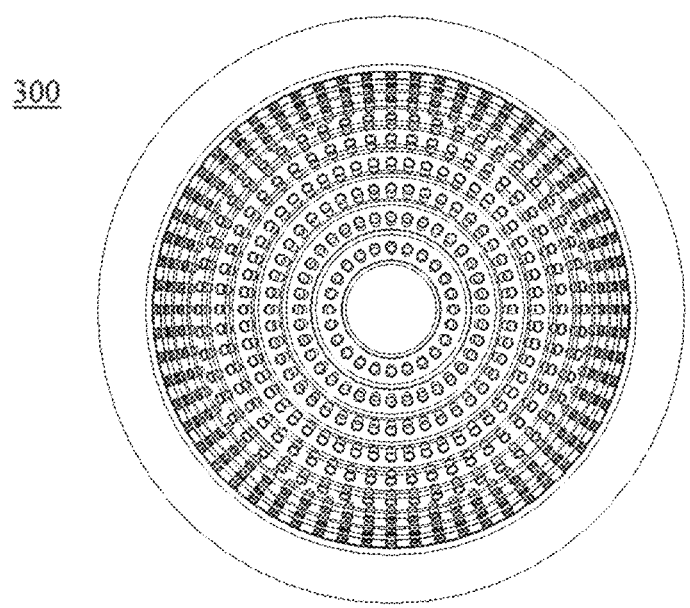
Figure 3E:
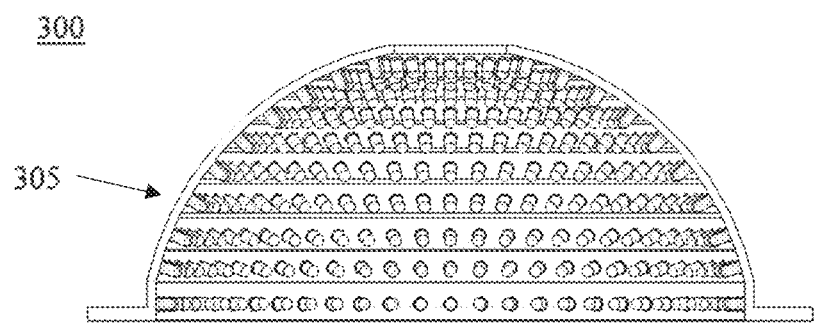
Figure 3F:
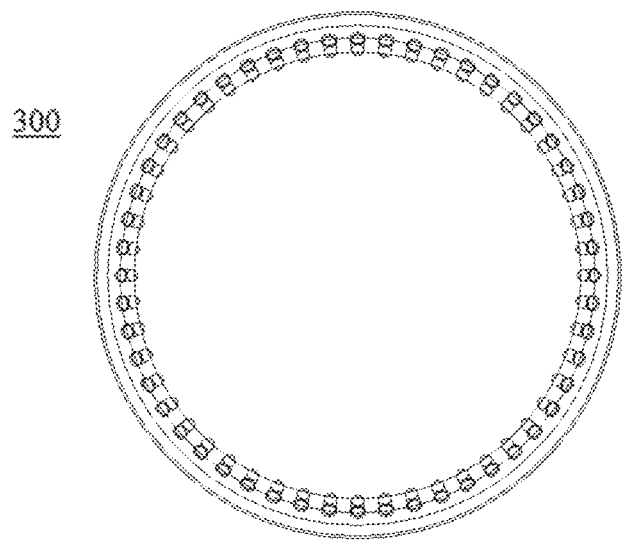
Figure 3G:
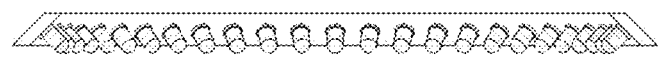

FIGS. 3A to 3G show schematic diagrams of a light source 300 of light source component 120, shown in FIG. 1 arranged as cross-sections inside the light housing according to an embodiment of the present disclosure. FIGS. 3A-3D show side view, top view, oblique view, and bottom view, respectively. FIG. 3D in particular shows a hemispherical area within light source 300 within which an object to be imaged may be positioned for appropriate lighting, using the techniques described herein, and imaging. These objects being imaged are intended to fit within light source 300. Further, light source 300 may include connections to cables for receiving and transmitting power or information, as appropriate. A plurality of LEDs 305 is arranged in vertical and horizontal cross-sections of the light housing as shown in FIG. 3E. FIGS. 3F and 3G show a bottom view and a side view of a single horizontal cross section 210 (shown in FIG. 2A).

It should be noted that although FIGS. 3A-3G use LEDs as examples of the light source 300, those skilled in the art should understand that the light source is not limited to LEDs and may be implemented be other sources which are known to those of ordinary skill in the art or described herein.

Figure 4A:
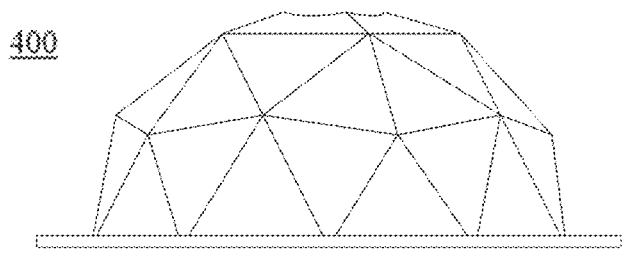
FIGS. 4a to 4g illustrate schematic diagrams of the light source arranged as a geodesic dome inside the light housing according to an embodiment of the present disclosure.
Figure 4B:
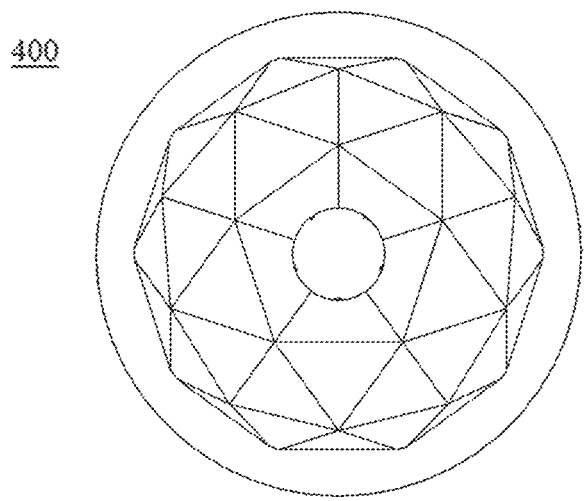
Figure 4C:
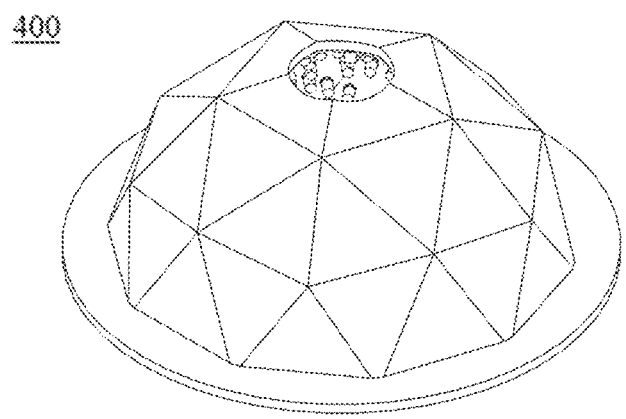
Figure 4D:
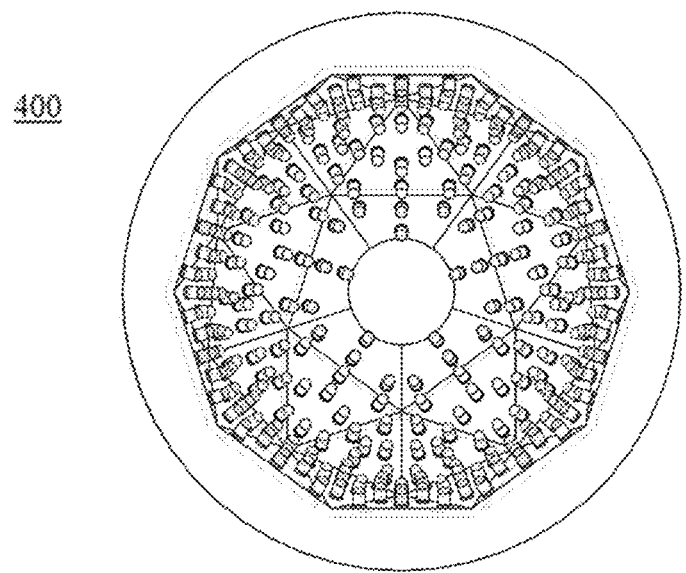
Figure 4E:
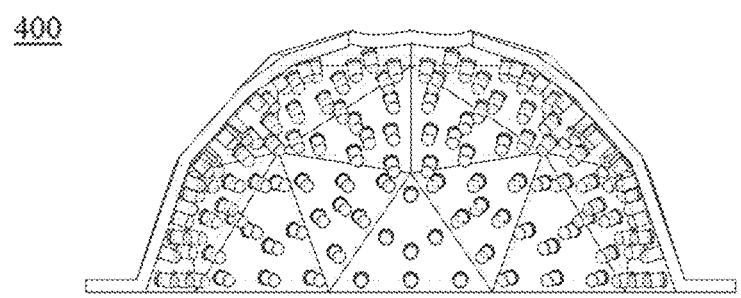
Figure 4F:
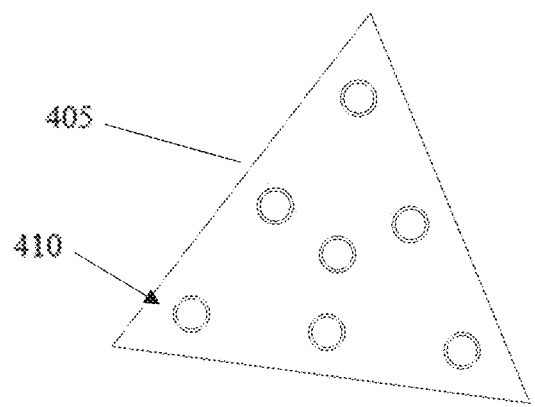
Figure 4G:
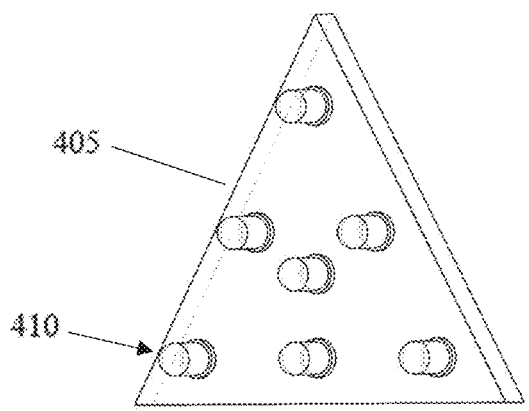

FIGS. 4A-4G illustrate schematic diagrams of light source 400 of light source component 120, shown in FIG. 1, implemented as a geodesic dome in a light housing according to an embodiment of the present disclosure. FIGS. 4A-4E illustrate a show side view, top view, oblique view, bottom view, and cross-section of the light source 400 arranged as a geodesic dome inside the light housing. FIGS. 4F and 4G illustrate a front view and an oblique view of a single triangle 405 when the light source 400 is arranged as a geodesic dome inside the light housing.

It should be noted that although FIGS. 4F and 4G use LEDs 410 as examples of the light source, those skilled in the art should understand that the light source is not limited to LEDs and may be implemented be other sources which are known to those of ordinary skill in the art or described herein.

It should be noted that those skilled in the art may select the arrangement of the light source and the light housing based on the specific shapes of both. Specific implementations are not limited to merely what is discussed here but, rather, extends to those implementations that embody the scope and spirit of the disclosure.

Based on the vertical and/or the horizontal incidence angle of the rays of light emitted by light source 300/400, the light source 300/400 may be implemented as cross-sections, a geodesic dome, or a hemispherical shell inside the light housing of light source component 110, such that the vertical and/or horizontal incidence angle of the light source may be controlled to achieve better image capture.

In another embodiment, the image capture component 120 may be used to capture images of the target object. The image capture component may comprise image-capturing devices, such as cameras and video cameras. The control component 130 may automatically adjust or set parameters such as the exposure time, lens focus, and polarization of the image capture component 120, using any technique known in the art.

In another embodiment, the control component 130 may be connected to the light source component 110 and the image capture component 120. The control component 130 may include a processor which may control the light source component to illuminate the target object according to a plurality of preset first optimal lighting configuration. The first optimal lighting configuration may comprise a lighting configuration matrix, with each value of the lighting configuration matrix representing a working status of each independently controllable light element, whether an LED or each pixel of a flexible screen. The working status may include at least one of an off state, an on state, or a value of brightness.

The processor may further control the image capture component 120 to capture multiple images of the target object to obtain multiple first images, under the illumination of the light source component, and generate a target image of a target object based on the plurality of first images.

In another embodiment, the preset multiple first optimal lighting configurations may be set randomly or based on experience. It is also possible to use automatic iterative testing to find the optimal lighting configuration and use this optimal configuration to determine a plurality of first optimal lighting configurations. The present disclosure does not limit the specific method of determining the first optimal lighting configuration.

In another embodiment, the first optimal lighting configuration may be expressed as a lighting configuration matrix. Each value of the lighting configuration matrix represents the working status of each independently controllable LED and/or each pixel on the flexible screen, with the working status being at least one of an off condition, an on condition, or a value of brightness. For example, a value of 0 in the lighting configuration matrix means that particular light element (LED or pixel) is off, a value greater than 0 means on, a value of 1 means the maximum brightness, and a value of 0.5 means that the brightness is half of the maximum brightness.

In another embodiment, when the LEDs or the pixels of the flexible screen have multiple wavelengths/colors, independent control channels may be set for each wavelength/color, with a corresponding row or column in the lighting configuration matrix.

For example, an LED may emit light in three primary colors, red, green, and blue. Three independent control channels may be set for this LED, each corresponding to one color, and the lighting configuration matrix may have a row or column corresponding to each channel to blend the red, green, and blue color to produce another visible color. It should be noted that LEDs that emit light in the UV or infrared range may be similarly controlled.

In another embodiment, the control component 130 may control the light source component 110 to illuminate the target object according to the multiple first optimal lighting configurations, and under this illumination, the control component 130 may control the image capture component 120 to capture multiple images of the target object and obtain multiple first images.

Light source component 110 may include multiple illumination modes corresponding to the first optimal lighting configurations. In any lighting mode, the control component 130 may control the image capture component 120 to perform one image capture of the target object to obtain the first image, and order the light source component 110 to switch to another lighting mode and perform image capture under this new mode until one image is captured under all lighting modes. These images form a set of first images.

During the image capture process, each object (including the light source component 110, image capture component 120, and target object) may be stationary, meaning that the relative positions and angles between all objects remain unchanged.

In another embodiment, after obtaining a plurality of first images, the control component 130 may generate a target image of the target object by division, selection, and fusion using the plurality of first images.

According to an embodiment of the present disclosure, the fused imaging device comprises a light source component 110, an image capture component 120, and a control component 130. Based on the preset multiple first optimal lighting configurations, the control component 130 may control the light source component 110 to illuminate the target object. Under such illumination, the control component 130 may control the image capture component to capture multiple images of the target object to obtain multiple first images and generate the target image of the target object according to these first images. By using a plurality of customizable first light configurations and adjusting incidence angles, patterns, and wavelength of the light source in the light source component, the light source component 110 may be made compatible with multiple surface materials, defect types, and environments. By capturing images multiple times and using these images to generate the target image, the method ensures that the target image is globally optimal in providing an accurate image of the target object.

In another embodiment, generation of the target image of the target object using the multiple first images comprises may be completed by a processor in control component 130 by at least one of the following steps: (1) determining, respectively, the optimal target pixels for each pixel position, based on the characteristic value of each pixel at the same pixel position in the plurality of first images, and generate a target image of the target object according to the plurality of target pixels; 2) selecting a plurality of characteristic areas from the plurality of first images according to preset selection criteria, and generating a target image of the target object according to the plurality of characteristic area; and 3) generating a three-dimensional image of the target object according to the plurality of the first images, and set this three-dimensional image as the target image of the target object.

In another embodiment, in generating the target image, it is possible to determine, respectively, the optimal target pixels for each pixel position, based on the characteristic value of each pixel at the same pixel position in the plurality of first images, and generate a target image of the target object according to the plurality of target pixels.

Any pixel position may have many pixels, each from a different first image at the corresponding position. From these pixels, it is possible to pick the pixel with the optimal characteristic value and set it as the target pixel and generate the target image by using the multiple determined target pixels.

An optimal characteristic value may include obtaining a largest grayscale value (brightest), a smallest grayscale value (darkest), a largest convolutional characteristic value, and a smallest convolutional characteristic value. The convolutional characteristic value may be obtained by performing convolution on a convolutional area, which may be defined as a set of pixels adjacent to one particular pixel. The weight of the convolutional area in obtaining an optimal characteristic value may be determined by manual commissioning or automatic learning (machine learning, deep learning, and/or by use of artificial intelligence).

It should be noted that those skilled in the art may determine a specific criteria for choosing the optimal characteristic value without departing from the scope or spirit of this disclosure.

In another embodiment, in generating the target image from multiple first images, it is possible to select multiple characteristic areas from the first images according to a preset criteria and generate a target image of the target object from these characteristic areas. Area selection criteria may be set according to actual conditions. For example, the selection criteria may comprise any one or more of the following: 1) selecting areas in the first images where the characteristic values of all pixels are greater than or equal to a preset first threshold; 2) selecting areas in the first images where the characteristic values of all pixels are less than or equal to a preset second threshold; and 3) selecting the area with the highest recognition accuracy in the first images; where recognition accuracy may means brightness and sharpness; for example, select pixels with brightness in the range of unsaturated grayscale zone, or select pixels with the highest sharpness; and 4) selecting the area with the highest convolutional characteristic value in the first images.

It should be noted that the area selection criteria may also include other conditions, and the present disclosure is not exhaustive of specific area selection criteria.

In another embodiment, when generating the target image of the target object based on multiple first images, it is possible to generate a three-dimensional image based on the multiple first images through imaging principles, for example, using the parameters of the light source component and the image capture component. This three-dimensional image may be used as the target image.

In this embodiment, generating pixel points with the optimal characteristic values in the multiple first images may be selected, or multiple characteristic areas may be selected from the multiple first images, or the three-dimensional images of the target object may be generated to determine a globally optimal image the target object. Using a globally optimal image may improve the accuracy of the target image.

In another embodiment, the control component 130 may cause the processor to 1) obtain N lighting configurations from the preset set of lighting configurations, by using N times of optimization selections, where N is an integer and N≥2; 2) determine the scores of the $N-1^{th}$ and the $N^{th}$ lighting configurations; 3) determine the second optimal lighting configuration based on the scores of the $N-1^{th}$ and the $N^{th}$ lighting configurations; and 4) determine a plurality of first optimal lighting configurations based on the second optimal lighting configuration.

In another embodiment, the number of lighting configurations in the preset lighting configuration set may be very large, for example, $10^{80}$ or more. To select the optimal lighting configuration from the lighting configuration set, an approximation may be used to select N lighting configurations by conducting N optimization selections.

After selecting N lighting configurations, scores for each of the $N-1^{th}$ and the $N^{th}$ lighting configurations may be determined, respectively. Of which, a score of the $N-1^{th}$ lighting configuration may be the score of the $N-1^{th}$ image captured according to the $N-1^{th}$ lighting configuration; the score of the $N^{th}$ lighting configuration is the $N^{th}$ image captured according to the $N^{th}$ lighting configuration.

A second optimal lighting configuration may be determined according to the scores of the $N-1^{th}$ and the $N^{th}$ lighting configurations. For example, when the score of the $N^{th}$ lighting configuration is greater than the score of the $N-1^{th}$ configuration, the $N^{th}$ configuration is set as the second optimal lighting configuration. Otherwise, the $N-1^{th}$ lighting configuration is set as the second optimal lighting configuration. The determined second optimal lighting configuration may be seen as the approximately optimal lighting configuration among the entire set of possible configurations. Then, the second optimal lighting configuration may be adjusted multiple times to obtain a plurality of the first optimal lighting configurations.

In this embodiment, through N optimization selections, N lighting configurations may be selected from the lighting configuration set, and the second optimal lighting configuration may be determined based on the scores of the $N-1^{th}$ and the $N^{th}$ lighting configurations. Then, a plurality of first optimal lighting configurations may be determined according to the second optimal lighting configurations, improving the efficiency and accuracy of selecting the first optimal lighting configurations.

In another embodiment, the control component 130 may obtain N lighting configurations from the preset set of lighting configurations, by using N times of optimization selections to 1) select any lighting configuration from the preset set of lighting configurations as the 1st lighting configuration; 2) determine the 2nd lighting configuration based on the 1st lighting configuration and preset selection criteria; 3) determine the currently optimal lighting configuration based on the $i-1^{th}$ and the $i^{th}$ lighting configurations, with i being an integer and $2 \le i \le N-1$; and 4) determine the $i+1^{th}$ lighting configuration based on the currently optimal lighting configuration and the selection criteria.

In another embodiment, when performing N optimization selections, a lighting configuration may be randomly selected from the preset lighting configuration set as the 1st lighting configuration; then, the 2nd lighting configuration may be determined based on the 1st lighting configuration and preset selection criteria.

Preset selection criteria may represent how to determine the lighting configuration matrix of the adjacent lighting configuration (for example, the 2nd lighting configuration) according to the matrix of the current lighting configuration (in this case, the 1st lighting configuration). The selection criteria may comprise any of the following:

1. determining the lighting configuration matrix of the adjacent lighting configuration by transforming a single value in the lighting configuration matrix of a current lighting configuration, which may specifically comprise: when the lighting configuration matrix of the current lighting configuration is not all 0, the transformed value is not 0; or, when the data in the lighting configuration matrix of the current lighting configuration is all 0, the transformed value may be any value within the possible range;

2. determining the lighting configuration matrix of the adjacent lighting configuration by transforming a single value in the lighting configuration matrix of the current lighting configuration, which may specifically comprise: setting all values in a certain area in the lighting configuration matrix of the current lighting configuration (with all values being non-zero) to the same new value;

3. determining the lighting configuration matrix of the adjacent lighting configuration by performing operations such as translation, rotation, scaling, stretching, reflection, and projection on the lighting configuration matrix set by the current light source (for example, when performing translation, the lighting configuration matrix set by the current light source may be translated by a certain distance in the horizontal or vertical direction to obtain the lighting configuration matrix of the adjacent light configuration. When a row or column that comprises a value other than 0 is removed from the lighting configuration matrix, the removed row or column may be added to the opposite row or column); and 4. other two-dimensional transformations of the lighting configuration matrix.

It should be noted that those skilled in the art may set appropriate selection criteria according to actual conditions, and the present disclosure does not limit the choices.

In another embodiment, the currently optimal lighting configuration may be determined according to the and the $i^{th}$ lighting configurations, and then the $i+1^{th}$ light source may be determined according to the currently optimal lighting configuration and selection criteria. In this way, N lighting configurations may be obtained.

In another embodiment, a method that determines the currently optimal lighting configuration based on the $i-1^{th}$ lighting configuration and the $i^{th}$ lighting configuration comprises: 1) determining the scores of the $i-1^{th}$ and the $i^{th}$ lighting configuration, respectively; and 2) when the score of the $i^{th}$ lighting configuration is greater than the score of the $i-1^{th}$ lighting configuration, set the $i^{th}$ lighting configuration as the currently optimal lighting configuration.

In another embodiment, scores of the $i-1^{th}$ and the $i^{th}$ lighting configurations may be determined independently.

When determining the score of the $i-1^{th}$ lighting configuration, the control component may control the light source component 110 to illuminate the target object according to the $i-1^{th}$ lighting configuration; under the illumination of the light source component 110, the image capture component 120 captures images of the target object to obtain the $i-1^{th}$ image; then, according to the preset defect area, the control component 130 may mark defects on the $i-1^{th}$ image to determine the defect area in the $i-1^{th}$ image.

After determining the defect area in the $i-1^{th}$ image, the pixels in the defective area in the $i-1^{th}$ image may be regarded as multiple first pixels, and the first average value of the first pixel values may be determined; the pixels outside the defect area in the $i-1^{th}$ image may be regarded as second pixels, and the second average value of the pixel values of the second pixels may be determined; then. The control component 130 may further calculate a difference between the first and second average value, and take a ratio of this difference to a preset theoretical maximum difference (for example: if the pixel value is the 0-255 grayscale, then the theoretical maximum difference is set to 255) as a score of the $i-1^{th}$ lighting configuration.

In another embodiment, when the $i-1^{th}$ image includes multiple channels, the multiple first pixels comprise pixels in the defect areas of all channels of the $i-1^{th}$ image; the multiple second pixels comprise pixels outside the defect area of all channels of the $i-1^{th}$ image.

In another embodiment, scores of the $i-1^{th}$ lighting configuration may be determined by the following equation:

$$S = \frac{|\overline{P_{ng}} - \overline{P_{ok}}|}{P_{max}}$$

where, $\overline{P_{ng}}$ represents a first average value of pixels, $\overline{P_{ok}}$ represents a second average value of pixels, and $P_{max}$ represents the theoretical maximum difference.

In another embodiment, a method for determining a score of the $i^{th}$ lighting configuration may be similar to that for the $i-1^{th}$ light configuration.

In another embodiment, after obtaining scores of the $i-1^{th}$ and the $i^{th}$ lighting configurations, the two may be compared. When the score of the $i^{th}$ lighting configuration is greater than the score of the $i-1^{th}$ lighting configuration, the $i^{th}$ lighting configuration is determined as a currently optimal lighting configuration. Then, a currently optimal lighting configuration may be used as the center of the search, and the $i+1^{th}$ lighting configuration may be determined from the lighting configuration set according to the selection criteria.

In another embodiment, determining the currently optimal lighting configuration according to the $i-1^{th}$ and the $i^{th}$ lighting configurations may further comprise: 1) when a score of the $i^{th}$ lighting configuration is less than or equal to the score of the $i-1^{th}$ lighting configuration, determining a probability of choosing the $i^{th}$ lighting configuration as the currently optimal lighting configuration, based on the scores of the $i^{th}$ and the $i-1^{th}$ lighting configurations, and the selection round i; and 2) when a selection probability is greater than the preset probability threshold, the $i^{th}$ lighting configuration is set to be the currently optimal lighting configuration.

In another embodiment, in the case that a score of the $i^{th}$ lighting configuration is less than or equal to the score of the $i-1^{th}$ lighting configuration, it may be advisable to determine a selection probability of selecting the $i^{th}$ lighting configuration as a currently optimal lighting configuration. Based on scores of the $i^{th}$ and the $i-1^{th}$ lighting configurations and the selection round i, a probability of selecting the $i^{th}$ lighting configuration as the currently optimal lighting configuration may be determined.

In another embodiment, the following equation may be used to determine the probability $p_i$ of selecting the $i^{th}$ lighting configuration as the currently optimal lighting configuration:

$$p_i = e^{(S_i - S_{i-1})/T}$$

where $S_i$ represents the score of the $i^{th}$ lighting configuration, $S_{i-1}$ represents the score of the $i-1^{th}$ lighting configuration, $T=(N-i)$ IN, and e is the base of the natural logarithm.

In another embodiment, after determining the selection probability of selecting the $i^{th}$ lighting configuration as a currently optimal lighting configuration, a selection probability, and a preset selection probability threshold may be compared. In the case that a selection probability of selecting the $i^{th}$ lighting configuration as the currently optimal lighting configuration is greater than the selection probability threshold, the $i^{th}$ lighting configuration may be considered to meet the selection criteria, and the $i^{th}$ lighting configuration may be determined as the currently optimal lighting configuration.

In another embodiment, determining a currently optimal lighting configuration according to the $i-1^{th}$ and the $i^{th}$ lighting configurations may further comprise: when a selection probability is less than or equal to a selection probability threshold, an $i-1^{th}$ lighting configuration is determined as a currently optimal lighting configuration.

As a result, when the selection probability of selecting an $i^{th}$ lighting configuration as the currently optimal lighting configuration is less than or equal to a selection probability threshold, it may be considered that an $i^{th}$ lighting configuration does not meet a selection criteria, and the $i-1^{th}$ lighting configuration is determined as a currently optimal lighting configuration.

In another embodiment, in determining a second optimal lighting configuration according to scores of the $N-1^{th}$ and the $N^{th}$ lighting configurations, when a score of the $N^{th}$ lighting configuration is less than or equal to a score of the $N-1^{th}$ lighting configuration, the above method may also be used to determine a probability of selecting an $N^{th}$ configuration as a currently optimal lighting configuration. When that probability is greater than a selection threshold, the $N^{th}$ light source is set to be a second optimal lighting configuration and when that probability is less than or equal to a selection probability threshold, the $N-1^{th}$ lighting configuration may be set to be the second optimal lighting configuration.

Figure 5:
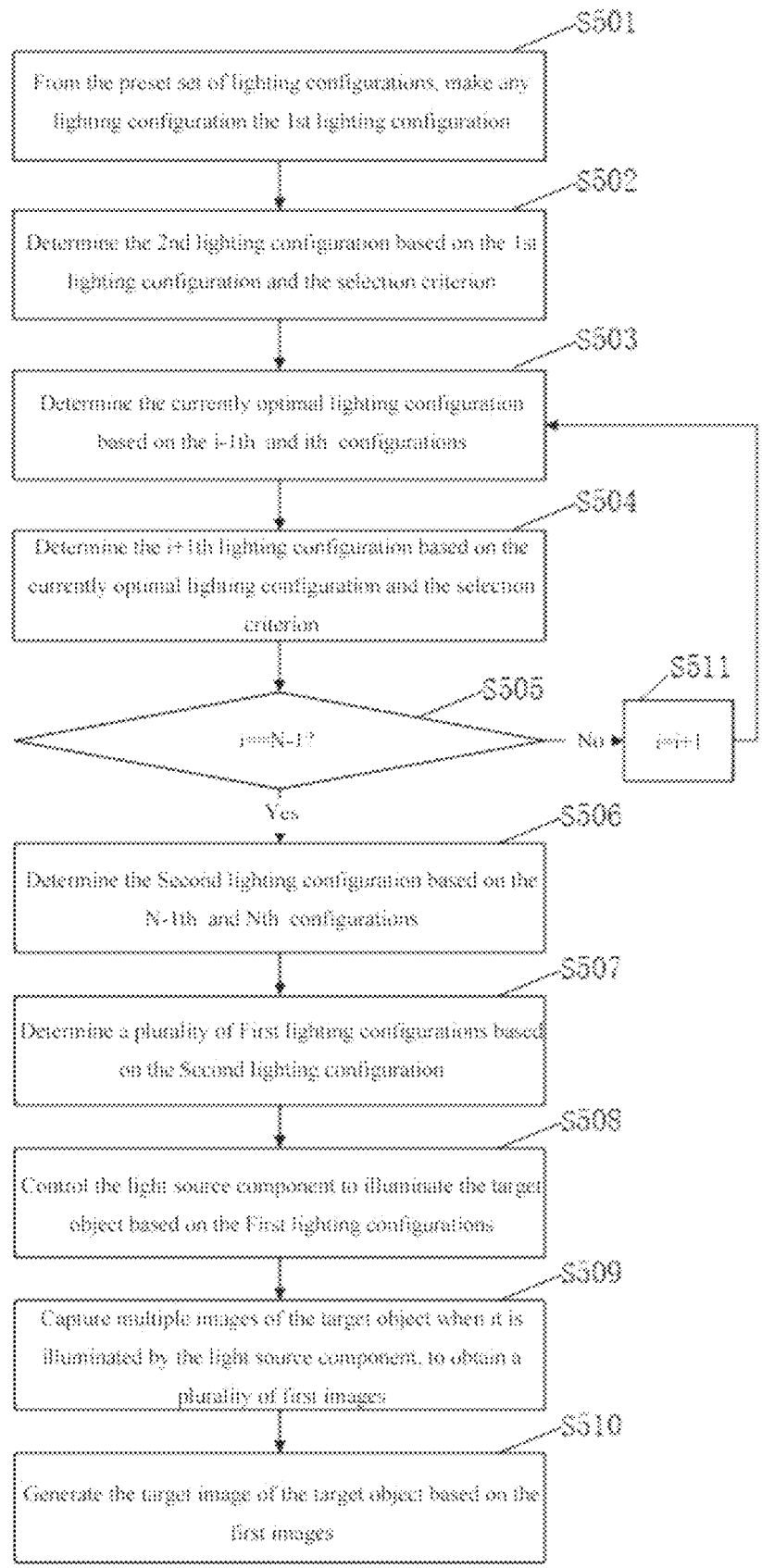
FIG. 5 illustrates a flow diagram of a method executed by a control component according to an embodiment of the present disclosure.

FIG. 5 shows a flow diagram of how the control component 130 may use a processor to execute a method according to an embodiment of the present disclosure. As shown in FIG. 5, when capturing images of a target object, multiple first optimal lighting configurations may be determined according to an optimal lighting configuration (i.e., the second optimal lighting configuration) selected from the preset lighting configuration set. At step S501 a processor selects any lighting configuration from the set of lighting configurations as a 1st lighting configuration. At step S502 the processor determines a 2nd lighting configuration according to the 1st lighting configuration and selection criteria, and at step S503 the processor determines a currently optimal lighting configuration according to the i−1$^{th}$ and the i$^{th}$ lighting configurations. For example, a currently optimal lighting configuration may be determined according to the 1st and 2nd lighting configurations. At step S504 the processor determines an i+1$^{th}$ lighting configuration according to the currently optimal lighting configuration and selection criteria, and at step S505 the processor determines whether or not i equals N−1, that is, whether i=N−1.

When i does not equal to N−1, at step S511, a processor increases the count of i by 1, and then continues to execute steps S503 through S505 until i equals N−1;

When i does equal N−1, in step S506, the second optimal lighting configuration may be determined by the processor according to the N−1$^{th}$ and the N$^{th}$ lighting configurations.

After determining the second optimal lighting configuration, the processor at step S507 determines multiple first optimal lighting configurations according to a second optimal lighting configuration. At step S508 the processor controls the light source component to illuminate the target object according to the multiple first optimal lighting configurations. At step S509 the processor controls image capture component 120 to capture multiple images of the target object under the illumination of the light source component 110, to obtain a plurality of first images. At step S510 the processor generates a target image of a target object, based on the multiple first images. In this way, the steps completed the fused imaging process. The term "fused" in this context refers to the joining of optimal lighting configurations across a plurality of image to produce an optimal image of a target object.

Figure 6:
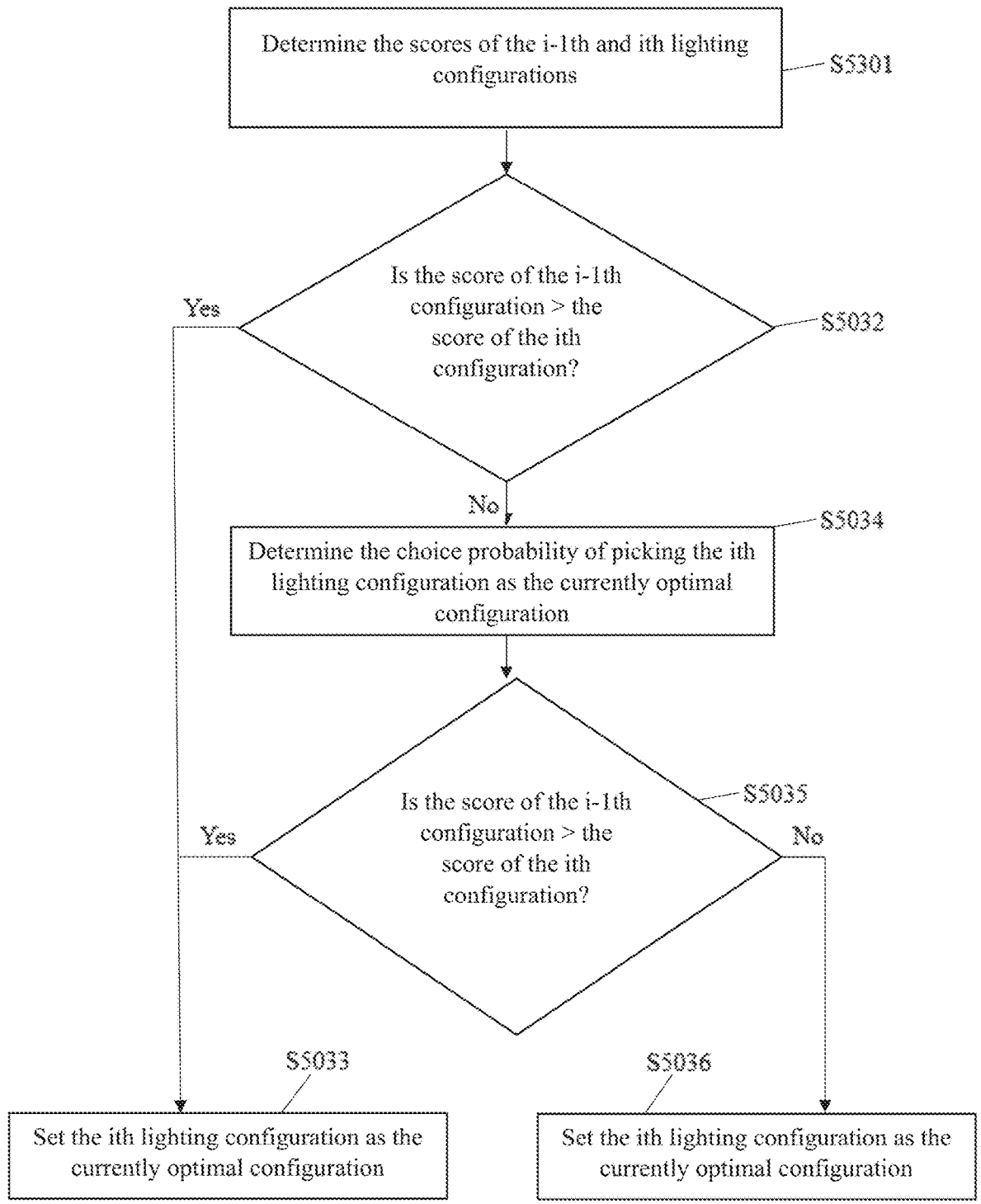
FIG. 6 illustrates a flow diagram of Step S503 of the control component, shown in FIG. 5 and according to an embodiment of the present disclosure.

FIG. 6 illustrates a flow diagram of step S503 of the control component 130 according to an embodiment of the present disclosure. As shown in FIG. 6, when determining an i+1$^{th}$ lighting configuration according to a currently optimal lighting configuration and selection criteria, At step S5031, a processor determines the scores of the i−1$^{th}$ and the i$^{th}$ lighting configurations, respectively. At step S5032 the processor determines whether a score of the i$^{th}$ lighting configuration is greater than a score of the i−1$^{th}$ lighting configuration.

When a score of the i$^{th}$ lighting configuration is greater than a score of the i−1$^{th}$ lighting, step S5033 is performed by the processor which sets the i$^{th}$ lighting configuration as a currently optimal lighting configuration.

When a score of the i$^{th}$ lighting configuration is less than or equal to a score of the i−1$^{th}$ lighting configuration, step S5034 is performed by the processor to determine a probability of selecting the i$^{th}$ lighting configuration as the currently optimal lighting configuration. At step S5035, the processor judges whether the selection probability is greater than a preset selection probability threshold. When the selection probability is greater than a selection probability threshold, step S5033 is performed and the processor sets the i$^{th}$ lighting configuration as the currently optimal lighting configuration. Otherwise, step S5036 is executed by the processor to set the i−1$^{th}$ lighting configuration as a currently optimal lighting configuration.

Figure 7:
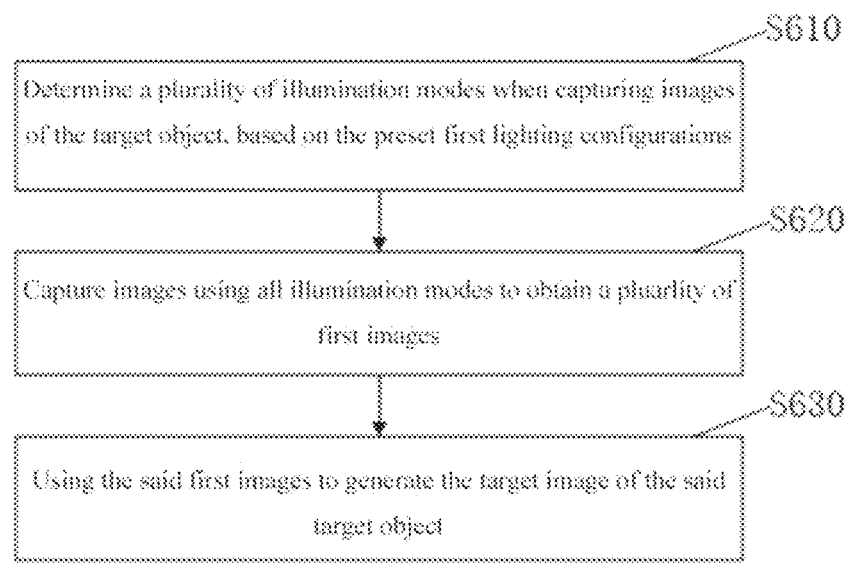
FIG. 7 illustrates a flow diagram of a fused imaging method according to an embodiment of the present disclosure.

FIG. 7 illustrates a flow diagram of the fused imaging method according to an embodiment of the present disclosure. As shown in FIG. 7, the method is executed by a processor and includes determining, at step S610, multiple lighting modes for capturing images of the target object, according to a preset multiple first optimal lighting configurations. The first optimal lighting configuration comprises a lighting configuration matrix with each value of the lighting configuration matrix representing the working status of each independently controllable LED and/or each pixel on the flexible screen. The working status including at least one of: an off state, an on state, or a value of brightness.

At step S620, the processor causes image capture component 120 to capture images of the target object in each lighting mode to obtain a plurality of first images. At step S630, the processor generates a target image of a target object based on the plurality of first images.

In another embodiment, the method may further cause the processor to: 1) obtain N lighting configurations from a preset set of lighting configurations by using N times of optimization selections, where N is an integer and N≥2; 2) determine scores of the N−1$^{th}$ and the N$^{th}$ lighting configurations; 3) determine a second optimal lighting configuration based on scores of the N−1$^{th}$ and the N$^{th}$ lighting configurations; and 4) determine a plurality of first optimal lighting configurations based on a second optimal lighting configuration. The target image of the target object may be analyzed for surface defects in the target object by control component 130. A processor, in control component 130, for example, may identify a surface defect from the target image and cause an indication to be provided to a user of a location of a surface defect on the surface of the target object. Such an indication may be provided by providing a display of the target image picture with a highlighted portion identifying a surface defect. Such an indication may be provided by causing light source component 120 to illuminate the surface defect for the user using the lighting source, a laser, or some other optical indication of a location of the surface defect on the target object.

The following examples are provided for illustrative embodiments of this disclosure:

Example 1. A fused imaging device, characterized in that the device comprises: a light source component which illuminates the target object for image capture where the light source component comprises a light source and a light housing, the light source including a plurality of LEDs and/or flexible screens; an image capture component which captures images of the target object; a control component which is connected to the light source component and the image capture component, the control component being configured to: control the light source component to illuminate the target object according to a plurality of preset first optimal lighting configurations, wherein the first of the plurality of preset optimal lighting configurations comprises a lighting configuration matrix, with each value of the lighting configuration matrix representing the working status of each independently controllable LED and/or each pixel on the flexible screen, the working status being at least one of the three: off, on, or a value of brightness; control the image capture component to capture multiple images of the target object to obtain multiple first images, under the illumination of the light source component; and generate a target image of the target object based on the plurality of first images.

Example 2 may include the example of claim 1 and be further characterized in that the control component is further configured to: obtain N lighting configurations from the preset set of lighting configurations by using N times of optimization selections, where N is an integer and N≥2; determine the scores of the N−1$^{th}$ and the N$^{th}$ lighting configurations; determine the second optimal lighting configuration based on the scores of the N−1$^{th}$ and the N$^{th}$ lighting configurations; and determine a plurality of first optimal lighting configurations based on the second optimal lighting configuration.

Example 3 may include examples 1 and 2 and be further characterized in that the device obtains N lighting configurations from the preset set of lighting configurations, by using N times of optimization selections, comprising; selecting any lighting configuration from the preset set of lighting configurations as the 1st lighting configuration; determining the 2nd lighting configuration based on the 1st lighting configuration and preset selection criteria; determining the currently optimal lighting configuration based on the and the $i^{th}$ lighting configurations, with i being an integer and $2 \le i \le N-1$; and determine the $i+1^{th}$ lighting configuration based on the currently optimal lighting configuration and the selection criteria.

Example 4 may include examples 1-3 and be further characterized in that the device determines the currently optimal lighting configuration based on the $i-1^{th}$ and the $i^{th}$ lighting configurations, comprising: determining the scores of the $i-1^{th}$ and the $i^{th}$ lighting configuration, respectively and when the score of the $i^{th}$ lighting configuration is greater than the score of the $i-1^{th}$ lighting configuration, setting the $i^{th}$ lighting configuration as the currently optimal lighting configuration.

Example 5 may include examples 1-4 and be further characterized in that the device determines the currently optimal lighting configuration according to the $i-1^{th}$ and the $i^{th}$ lighting configurations, further comprises: when the score of the $i^{th}$ lighting configuration is less than or equal to the score of the $i-1^{th}$ lighting configuration, determining the probability of choosing the $i^{th}$ lighting configuration as the currently optimal lighting configuration, based on the scores of the $i^{th}$ and the $i-1^{th}$ lighting configurations, and the selection round i; and when the selection probability is greater than the preset probability threshold, setting the $i^{th}$ lighting configuration as the currently optimal lighting configuration.

Example 6 may include any of examples 1-5 and be further characterized in that the device determines the currently optimal lighting configuration according to the $i-1^{th}$ and the $i^{th}$ lighting configurations, further comprises: when the selection probability is less than or equal to the probability threshold, setting the $i-1^{th}$ lighting configuration as the currently optimal lighting configuration.

Example 7 may include any of examples 1-6 and be further characterized in that the device determines the score of the $i-1^{th}$ lighting configuration, comprises: controlling the light source component to illuminate the target object according to the lighting configuration; capturing an image of the target object by using the image capture component to obtain the image; determining the defect area in the image according to the preset defect area; determining the first average pixel values of the plurality of the first pixels and the second average pixel values of the plurality of the second pixels, both in the image; of which, the first pixels are pixels inside the defect area in the image, and the second pixels are pixels outside the defect area in the image; calculating the difference between the first and second average pixel values, and setting the ratio of this difference to a preset theoretical maximum difference as the score of the lighting configuration.

Example 8 may include any of examples 1-7 and be further characterized in that the light housing is approximately in the shape of a hemispherical shell, and the light source is arranged inside the light housing in configurations of cross-sections, geodesic dome, or hemispherical shell, such that the vertical and/or the horizontal incidence angle of the light from the light source is controllable.

Example 9 may include any of examples 1-8 and be further characterized in that it generates a target image of the target object according to the plurality of first images, using at least one of the following methods: determining, respectively, the optimal target pixels for each pixel position, based on the characteristic value of each pixel at the same pixel position in the plurality of first images, and generating a target image of the target object according to the plurality of target pixels; selecting a plurality of characteristic areas from the plurality of first images according to preset selection criteria, and generating a target image of the target object according to the plurality of characteristic areas; and generating a three-dimensional image of the target object according to the plurality of the first images, and setting this three-dimensional image as the target image of the target object.

Example 10 may include any of examples 1-9 and be further characterized in that the method comprises: determining multiple lighting modes for capturing images of the target object, according to the preset multiple first optimal lighting configurations, wherein the first optimal lighting configuration comprises a lighting configuration matrix, with each value of the lighting configuration matrix representing the working status of each independently controllable LED and/or each pixel on the flexible screen, with the working status being at least one of the three: off, on, or a value of brightness; in each lighting mode, capturing images of the target object to obtain multiple first images; and generating a target image of the target object based on the plurality of first images.

The above are only examples of embodiments of the present invention and do not limit the scope of the patent protection of the present invention. Any equivalent transformation of structures and processes, made using the description and drawings of the present invention, or directly or indirectly applied to other related technical fields, are therefore also included in the scope of patent protection of the present invention.

What is claimed is:
1. A method, comprising:
illuminating, by a plurality of light sources controlled by a processor, a target object according to a plurality of preset first optimal lighting configurations, the plurality of first preset optimal lighting configurations including a lighting configuration matrix representing a working condition of each one of the plurality of light sources;
capturing, by an image capture component controlled by a processor, multiple images of the target object to obtain a plurality of first images under the illumination of the light source component; and
generating, by the processor and based on the capturing of the multiple images of the target object, a target image of the target object based on the plurality of first images,
wherein illuminating the target object according to a plurality of preset first optimal lighting configurations includes:
obtaining, by the processor, N lighting configurations from the preset optimal lighting configurations by using N times of the optimization selections where N is an integer and $N \ge 2$;
determining, by the processor, scores of the $N-1^{th}$ and the $N^{th}$ lighting configurations;
determining, by the processor, a second optimal lighting configuration based on the scores of the $N-1^{th}$ and the $N^{th}$ lighting configurations; and determining, a plurality of first optimal lighting configurations based on the second optimal lighting configuration.

2. The method of claim 1, wherein each of the plurality of light sources is independently controllable.

3. The method of claim 2, wherein each of the plurality of light sources in an LED.

4. The method of claim 2, wherein each of the plurality of light sources is a pixel.

5. The method of claim 1, wherein the working conditions for each one of the plurality of light sources includes an off condition, an on condition, and a value of brightness for each one of the plurality of light sources.

6. The method of claim 1, wherein obtaining N lighting configurations from the preset optimal lighting configurations comprises:

selecting, by the processor, any lighting configuration from the preset set of optimal lighting configurations as a first lighting configuration, determining, by the processor a second lighting configuration, the second lighting configuration being based on the first lighting configuration and preset selection criteria;

determining, by the processor, a currently optimal lighting configuration based on the $i-1^{th}$ and the $i^{th}$ lighting configurations, with i being an integer and $2 \leq i \leq N-1$, and determining, by the processor, the $i+1^{th}$ lighting configuration based on the currently optimal lighting configuration and the selection criteria.

7. The method of claim 6, wherein determining the currently optimal lighting configuration comprises:

determining, by the processor and when a score of the $i^{th}$ lighting configuration is less than or equal to a score of the $i-1^{th}$ lighting configuration, a probability of choosing the $i^{th}$ lighting configuration as the currently optimal lighting configuration based on the scores of the $i^{th}$ and the $i-1^{th}$ lighting configurations and the integer i;

determining, by the processor, when the probability of choosing the $i^{th}$ lighting configuration as the currently optimal lighting configuration is greater than a preset probability threshold; and setting, by the processor and in response to the determination that the $i^{th}$ lighting configuration has a greater probability of being the currently optimal lighting configuration, the $i^{th}$ lighting configuration as the currently optimal lighting configuration for the target object.

8. The method of claim 7, determining the optimal lighting configuration further comprises:

setting, by the processor, the $i-1^{th}$ lighting configuration as the currently optimal lighting configuration when a probability of the $i^{th}$ lighting configuration is the optimal lighting configuration is less than or equal to the probability threshold.

9. The method of claim 8, wherein determining a score of the $i-1^{th}$ lighting configuration comprises:

illuminating, by plurality of light sources, the target object according to the $i-1^{th}$ lighting configuration;

capturing, by the image capture component, an image of the target object to obtain an $i-1^{th}$ image;

determining, by the processor, a defect area of the $i-1^{th}$ image which is representative of a defect in the target object;

determining, by the processor, a first average pixel value for the defect area in the $i-1^{th}$ image;

determining, by the processor, a second average pixel value for the $i-1^{th}$ image of one or more portions target object in the $i-1^{th}$ lighting configuration that do not include the defect area;

calculating, by the processor, a difference between the first average pixel value and the second average pixel value; and setting, by the processor, a ratio of the difference to a preset maximum difference as the score of the $i-1^{th}$ lighting configuration.

10. The method of claim 9, wherein generating the target image includes:

determining, by the processor, optimal target pixels for each pixel position in the target image based on a characteristic value of each pixel of each pixel at the same pixel position in each of the first plurality of images.

11. The method of claim 9, wherein generating the target image includes:

selecting, by the processor, a plurality of characteristic areas of the target object from the plurality of first images according to preset selection criteria; and generating, by the processor, the target image based on the plurality of characteristic areas.

12. The method of claim 9, wherein generating the target image includes:

generating a three-dimensional image of the target object according to the plurality of first images; and setting the three-dimensional image as the target image for the target object.

13. The method of claim 1, further comprising:

determining multiple lighting modes for image capture of a target object according to the preset first optimal lighting conditions.

14. The method of claim 13, wherein the first optimal lighting condition comprises a lighting configuration matrix which represents a working status of each independently controllable light source among the plurality of light sources.

15. The method of claim 14, wherein the working status of each independently controllable light source includes an off status, an on status, and a value of brightness for each of the plurality of light sources.

16. The method of claim 1, wherein the plurality of light sources is arranged in a light housing having a hemispherical shape which allows the target object to be disposed inside the hemispherical shell.

17. The method of claim 16 further comprising:

controlling, by the processor, one or more of the vertical and horizontal incidence angle of light from the plurality of light sources.

18. The method of claim 1, wherein the plurality of light sources is arranged in a light housing having a geodesic dome shape which allows the target object to be disposed inside the geodesic dome.

19. The method of claim 18, further comprising:

controlling, by the processor, one or more of the vertical and horizontal incidence angle of light from the plurality of light sources.

* * * * *